(12) United States Patent
Maher et al.

(10) Patent No.: US 6,378,891 B1
(45) Date of Patent: *Apr. 30, 2002

(54) CONVERTIBLE STROLLER/SHOPPING CART

(75) Inventors: Susan H. Maher; Jay A. Maher, both of Lake Barrington, IL (US)

(73) Assignee: Nelson-Whittaker, Ltd., Crystal Lake, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 09/699,715

(22) Filed: Oct. 30, 2000

Related U.S. Application Data

(63) Continuation of application No. 09/594,315, filed on Jun. 15, 2000, now Pat. No. 6,170,854.

(51) Int. Cl.[7] ................................................ B62B 7/10
(52) U.S. Cl. .................... 280/648; 658/644; 658/DIG. 3
(58) Field of Search .................. 280/33.991, 33.993, 280/33.994, 33.995, 33.996, 33.997, 643, 644, 645, 647, 648, 657, 658, 30, 42, DIG. 3

(56) References Cited

U.S. PATENT DOCUMENTS

| | | | | |
|---|---|---|---|---|
| 1,271,270 A | * | 7/1918 | Briggs | 280/39 |
| 2,558,372 A | * | 6/1951 | Nidermayer, Jr. | 224/42.46 |
| 2,582,435 A | * | 1/1952 | Howard | 280/30 |
| 2,587,688 A | * | 3/1952 | Bosk | 280/39 |
| 2,615,726 A | * | 10/1952 | Brottman | 280/47 |
| 2,635,797 A | * | 4/1953 | Siebert | 224/43.46 |
| 2,693,366 A | * | 11/1954 | Randolph | 280/39 |
| 3,000,645 A | * | 9/1961 | Schmidt | 280/39 |
| 3,497,234 A | * | 2/1970 | Schray | 280/33.992 |
| 3,885,806 A | * | 5/1975 | Trubiano | 280/33.993 |
| 4,046,394 A | * | 9/1977 | Thompson, Jr. | 280/33.993 |
| 4,247,130 A | * | 1/1981 | Paterson | 280/654 |
| 4,248,443 A | * | 2/1981 | Ohlson | 280/39 |
| 4,620,711 A | * | 11/1986 | Dick | 280/30 |
| 4,659,096 A | * | 4/1987 | Leimgruber | 280/39 |
| 4,824,167 A | * | 4/1989 | King | 297/129 |
| 5,090,724 A | * | 2/1992 | Fiore | 280/643 |
| 5,125,674 A | * | 6/1992 | Manuszak | 280/30 |
| 5,149,114 A | * | 9/1992 | Lewandowski et al. | 280/33.992 |
| 5,356,160 A | * | 10/1994 | Urlwin | 280/30 |
| D363,589 S | * | 10/1995 | Lafleur et al. | D34/21 |
| 5,544,904 A | * | 8/1996 | Maher | 280/47.35 |
| 5,553,876 A | * | 9/1996 | Trubiano | 280/33.991 |
| 5,918,891 A | * | 7/1999 | Russell | 280/33.991 |
| 6,155,592 A | * | 12/2000 | Hsia | 280/647 |
| 6,170,854 B1 | * | 1/2001 | Maher et al. | 280/648 |

FOREIGN PATENT DOCUMENTS

| | | | | |
|---|---|---|---|---|
| GB | 2082513 | * | 3/1982 | 280/645 |
| JP | 10250584 | * | 9/1998 | 280/645 |

* cited by examiner

Primary Examiner—Brian L. Johnson
Assistant Examiner—Bridget Avery
(74) Attorney, Agent, or Firm—Lee, Mann, Smith, McWilliams, Sweeney & Ohlson

(57) ABSTRACT

A convertible stroller and shopping vehicle having a stroller portion and a shopping vehicle portion. The stroller portion includes a seat which is movable from a deployed position to a stowed position. In the deployed position, the invention is used as a stroller. The shopping vehicle portion includes a collapsible receptacle that can be oriented in one of two orientations. In an open orientation, the receptacle creates a shopping cart while in a collapsed orientation the invention can be used to transport bulk materials.

6 Claims, 2 Drawing Sheets

CONVERTIBLE STROLLER/SHOPPING CART

RELATED APPLICATION

This application is a continuation of U.S. pat. application Ser. No. 09/594,315, filed Jun. 15, 2000, now U.S. Pat. No. 6,170,854.

BACKGROUND OF THE INVENTION

This invention relates to shopping carts and children's strollers, and in particular to a stroller which may easily and quickly be converted from a stroller into either a shopping cart or a carrier for large items.

Convertible strollers have been developed in the past, as explained in U.S. Pat. No. 5,544,904, the disclosure of which is incorporated herein by reference. As explained in the '904 patent, strollers of the nature of the invention of the present application are generally of substantial construction and are typically provided by department stores, shopping malls and the like as a convenience for their customers during shopping.

The convertible stroller of the '904 patent, however, suffers one disadvantage. Since the seat is fixed in place, the size of the shopping cart, when the conversion to shopping is effected, is generally constrained by the size of the seat, although the shopping cart portion obviously extends well above and beyond the seat, as well. Also, because the seat is fixed in place, it is difficult for large, bulky items, such as boxes, to be transported with any ease. There is therefore the need for an improved version of the convertible stroller of the '904 patent, which is more versatile.

SUMMARY OF THE INVENTION

The invention provides a readily usable and convenient convertible stroller and shopping vehicle combination. It includes a stroller portion and a shopping vehicle portion. The stroller portion includes a frame supported by a plurality of wheels and a seat secured to the frame. The seat is moveable from a deployed position to a stowed position, with the stowed position being displaced from the deployed position. A handle assembly is provided, secured to the frame and includes a handle for the device which is located rearwardly of the seat when the seat is in the deployed position. The shopping vehicle portion includes a collapsible receptacle and a pivotal bar, with the receptacle being secured to and moveable with movement of the pivotal bar. The shopping vehicle portion also includes a receptacle support. The collapsible receptacle is moveable between an expanded position with the pivotal bar pivoted away from the handle assembly and with the collapsible receptacle in an open orientation above the receptacle support, and a collapsed position with the pivotal bar lying proximate the handle assembly and with the collapsible receptacle in a collapsed orientation located rearwardly of the seat when the seat is in the deployed position.

In accordance with the preferred form of the invention, the collapsible receptacle comprises an open mesh bag. A second receptacle, also in the form of an open mesh bag, can be secured to and suspended from the handle assembly.

The receptacle support comprises a rigid platform which is secured to the frame. The platform is located beneath, and supports, the seat when the seat is in the deployed position. It also supports the collapsible receptacle when it is in the expanded position.

Preferably, the seat is mounted so that it is pivotal from the deployed position to the stowed position. In the deployed position, the invention is used as a stroller. When the seat is in the stowed position, the receptacle can be moved to the expanded position so that the invention is used as a shopping cart. Alternatively, the receptacle can be left in the collapsed position, and with the seat remaining in the stowed position, the platform can transport relatively large articles with ease.

BRIEF DESCRIPTION OF THE DRAWINGS

The invention is described in greater detail in the following description of an example embodying the best mode of the invention, taken in conjunction with the drawing figures, in which.

DESCRIPTION OF AN EXAMPLE EMBODYING THE BEST MODE OF THE INVENTION

Figure 2:
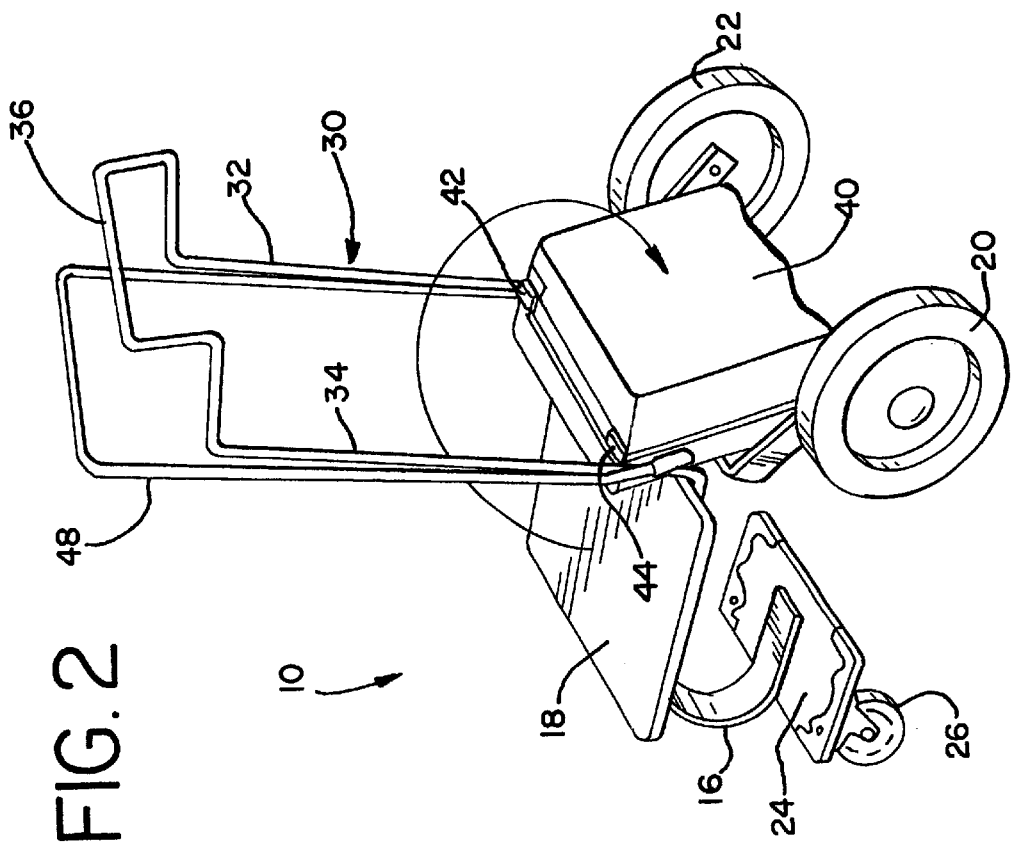
FIG. 2 is an illustration similar to FIG. 1, but with the seat pivoted to the stowed orientation.

A convertible stroller and shopping vehicle according to the invention is generally designated at 10 in the drawing figures. The stroller portion of the invention includes a series of frame members 12, 14 and 16 which may be joined in any conventional fashion, and which are preferably formed of metal or the like for strength and durability. When the frame members 12 through 16 are appropriately joined, they form a rigid frame for the convertible stroller and shopping vehicle 10.

A receptacle support, in the form of a rigid platform 18, is secured to the frame members 12 through 16, again in any conventional fashion. As best illustrated in FIG. 2, the platform 18 is generally flat, and is also formed of a suitably rigid material, such as metal.

The frame member 12 is generally U-shaped, and supports a pair of opposite large, fixed wheels 20 and 22. The wheel 20 and 22 are mounted for rotation about respective axles, which may be conventional and are therefore not illustrated in detail.

The frame member 16 curves downwardly and is secured to a foot plate 24. A pair of smaller, caster wheels 26 and 28 are pivotally secured to the underside of the foot plate 24 so that the convertible stroller and shopping vehicle 10 can be easily steered in whatever direction is desired during use.

A handle assembly 30 extends upwardly from the platform 18. The handle assembly 30 preferably is composed of opposite tubular members 32 and 34 which extend beneath, and are secured to the underside of, the platform 18. The tubular members extend to a transverse handle 36 which can be an integral extension of the tubular members 32 and 34, or a separate member secured thereto. The handle 36 can be covered with a grip 38 for comfort and facilitating use of the convertible stroller and shopping vehicle 10.

A seat 40, preferably molded from plastic, is positioned above the platform 18. The seat 40 includes a pair of brackets 42 and 44 fitted on a cross bar 46 extending between the tubular members 32 and 34. The brackets 42 and 44 permit pivoting of the seat 40 from a deployed position shown in FIG. 1 to a stowed position, displaced from the deployed position, shown in FIG. 2.

A pivotal bar 48 is pivotally pinned to the opposite tubular members 32 and 34. The bar is displacable from a generally upright orientation shown in FIGS. 1 and 2 in which the bar is generally coextensive with the tubular members 32 and 34 to a forwardly deployed position, as shown in FIG. 3, for providing support in the shopping cart orientation.

Figure 3:
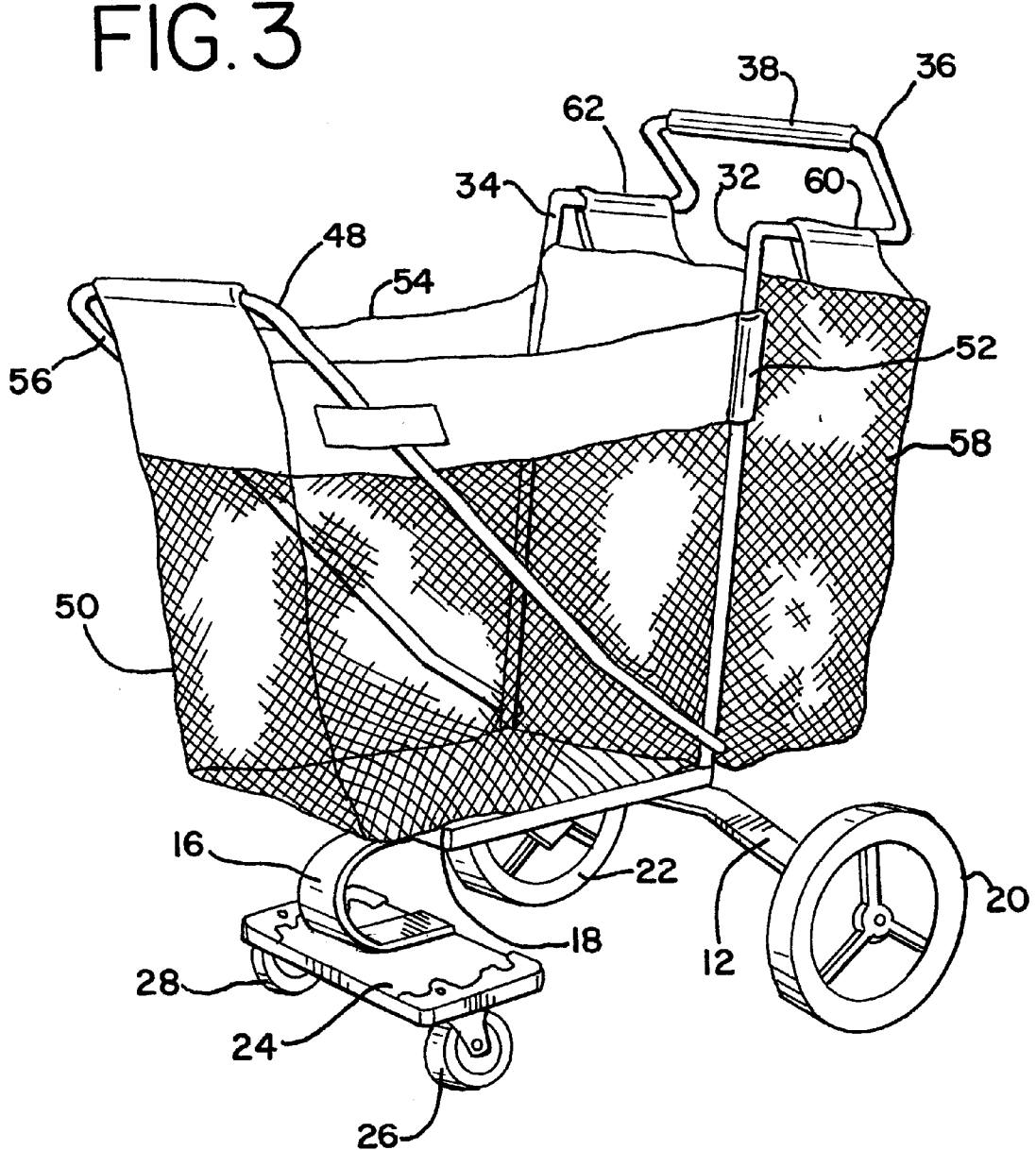
FIG. 3 is a perspective view of the convertible stroller and shopping vehicle according to the invention in the shopping cart position, with both mesh bags in place, and with the mesh bag of the collapsible receptacle being in the open orientation above the support platform.

As shown in FIG. 3, a collapsible receptacle 50 is suspended from the pivotal bar 48. The receptacle 50 is formed of a mesh bag topped by a fabric collar 52. The collar 52 is secured to the pivotal bar 48 by opposite fabric sleeves 54 (only one side shown in FIG. 3). A fabric hanging support 56 is secured about the pivotal bar 48 to complete the attachment of the collapsible receptacle 50 to the pivotal bar 48.

An auxiliary receptacle 58, also composed of a mesh bag, is secured to the handle 36 by means of fabric hanging supports 60 and 62. The auxiliary receptacle 58 can be used whether the invention is employed as a stroller, a shopping cart, or a transporting vehicle.

Figure 1:
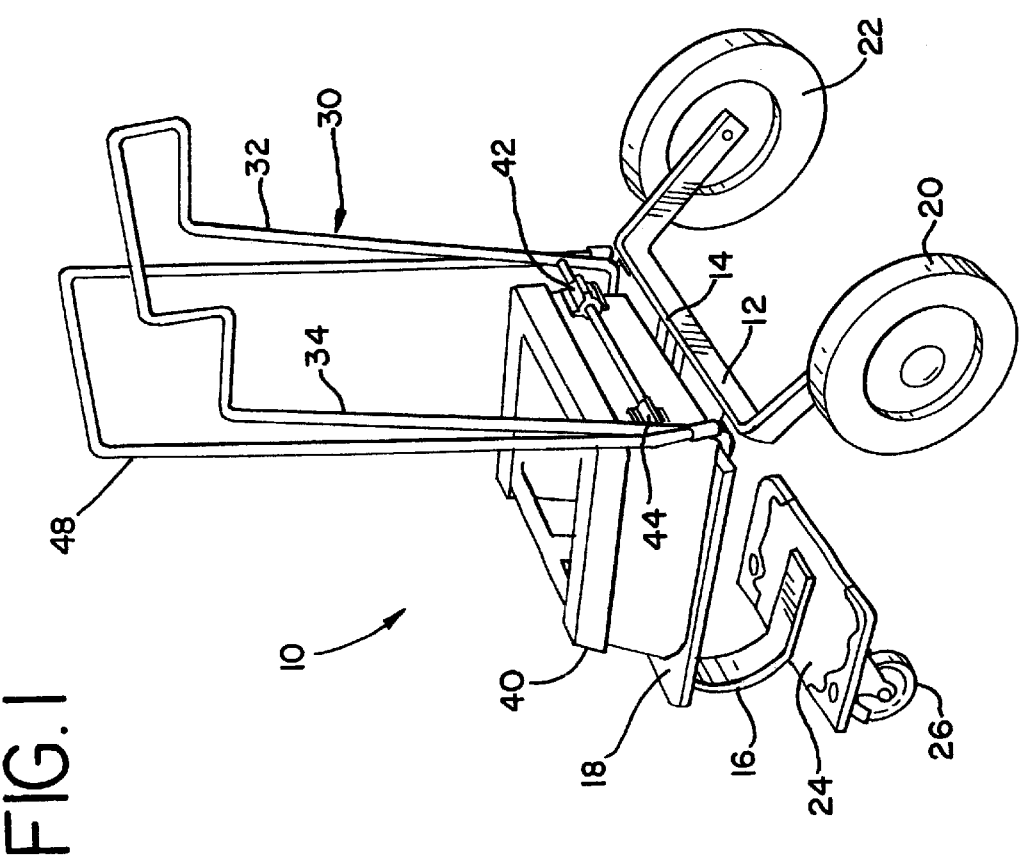
FIG. 1 is a perspective view of a convertible stroller and shopping vehicle according to the invention, with all mesh receptacles removed to illustrate detail, and with the seat in the deployed position.

The invention is used as a stroller in the orientation illustrated in FIG. 1. While the collapsible receptacle 50 and the auxiliary receptacle 58 are not illustrated, in the orientation shown in FIG. 1, the pivotal bar 48 is in the upright orientation, collapsing the receptacle 50 to precisely the orientation shown in FIG. 3 of incorporated U.S. Pat. No. 5,544,904. The receptacle 50 is thus in a collapsed orientation located rearwardly of the seat 40, and the convertible stroller and shopping vehicle 10 can be used as a stroller.

When it is desired to use the convertible stroller and shopping vehicle 10 to transport bulky items, such as boxes, the seat 40 can be pivoted to the stowed position illustrated in FIG. 2, fully exposing the platform 18. The pivotal bar 48 remains in the upright orientation, and the receptacle 50 therefore remains collapsed.

When a shopping cart function is desired, the pivotal bar 48 is pivoted to the orientation shown in FIG. 3, so that the collapsible receptacle 50 is deployed over the rigid platform 18. Because the seat 40 remains in the stowed position shown in FIG. 2, the receptacle 50 provides a large capacity, with both the collapsible receptacle 50 and the auxiliary receptacle 58 being used for carrying of articles.

The invention therefore serves three functions, as a stroller (FIG. 1), a transporting vehicle for boxes and other large items (FIG. 2) and a shopping cart (FIG. 3). Various changes can be made to the invention without departing from the spirit thereof or scope of the following claims.

What is claimed is:

1. A convertible stroller and shopping vehicle, comprising
   a. a frame supported by a plurality of wheels at four corners thereof,
   b. a generally horizontal support secured to said frame such that at least one side of support is accessible for loading of items horizontally onto said support,
   c. a stroller orientation and a transport orientation,
   d. said stroller orientation including a seat secured above said support in a seat-deployed position,
   e. said transport orientation including said support with said seat moved to a seat-stowed position, exposing at least a portion of said support,
   f. a handle assembly secured to said frame and including a handle located rearwardly of said seat when in the seat-deployed position, and
   g. a collapsible receptacle and a pivotal bar secured to said frame, said receptacle being secured to and moveable with movement of said pivotal bar.

2. A convertible stroller and shopping vehicle according to claim 1 in which said receptacle is moveable between an expanded position with said pivotal bar pivoted away from said handle assembly and with said receptacle in an open orientation above said support, and a collapsed position with said pivotal bar lying proximate said handle assembly and with said receptacle located rearwardly of said seat when in the seat-deployed position.

3. A convertible stroller and shopping vehicle according to claim 1 in which said support is located beneath, and supports, said seat in the seat-deployed position.

4. A convertible stroller and shopping vehicle according to claim 1 in which said seat is pivotal from the seat-deployed position to the seat-stowed position.

5. A convertible stroller and shopping vehicle according to claim 1 including a receptacle secured to said handle assembly.

6. A convertible stroller and shopping vehicle according to claim 5 in which said receptacle comprises an open mesh bag.

* * * * *